United States Patent [19]

Bradatsch et al.

[11] 4,306,932
[45] Dec. 22, 1981

[54] APPARATUS FOR PRODUCING A SINGLE FACE COATED CORRUGATED PASTEBOARD

[76] Inventors: Edmund Bradatsch, Hüttenwerk 5; Hans Mosburger, Hüttenwerkstrasse 10, both of 8481 Weiherhammer, Fed. Rep. of Germany

[21] Appl. No.: 97,569

[22] Filed: Nov. 26, 1979

[30] Foreign Application Priority Data

Nov. 24, 1978 [DE] Fed. Rep. of Germany ....... 2851007

[51] Int. Cl.³ ............................. B31F 1/20; B32B 3/28
[52] U.S. Cl. .................................. 156/462; 156/470; 156/499; 156/543; 156/547; 156/556
[58] Field of Search ........ 156/205, 210, 462, 470–473, 156/499, 543, 547, 556; 74/231 CB; 425/370, 373, 369

[56] References Cited

U.S. PATENT DOCUMENTS

| | | | |
|---|---|---|---|
| 2,068,155 | 1/1937 | Swift, Jr. | 156/473 |
| 3,142,599 | 7/1964 | Chavannos | 156/210 |
| 3,157,551 | 11/1964 | Granozio | 156/471 |
| 3,165,783 | 1/1965 | Martelli | 425/370 |
| 3,516,116 | 6/1970 | Ladyjenski | 425/370 |
| 3,700,518 | 10/1972 | Ohmori | 156/470 |
| 3,904,473 | 9/1975 | Warner et al. | 156/470 |

FOREIGN PATENT DOCUMENTS 370951  9/1963  Switzerland.

Primary Examiner—Paul J. Thibodeau
Attorney, Agent, or Firm—Silverman, Cass & Singer, Ltd.

[57] ABSTRACT

Apparatus is provided for the production of a corrugated pasteboard having a cover coating on at least one side. The apparatus includes a toothed corrugating element, a toothed corrugating counter-element co-operating therewith, a glue applicator and a drying apparatus. At least one corrugating element is an endless element (2) which loops at least partially around the other element (1). In this manner the noise generation and roll wear are reduced, the quality of the corrugated cardboard is improved, the paper consumption and difficulties of adjustment of parts of the apparatus are reduced and the feed and introduction of the paper web are facilitated.

9 Claims, 2 Drawing Figures

APPARATUS FOR PRODUCING A SINGLE FACE COATED CORRUGATED PASTEBOARD

BACKGROUND OF THE INVENTION

The invention relates to an apparatus for producing a corrugated pasteboard having a cover coating on at least one side, comprising a toothed corrugating element and a toothed corrugating counter-element co-operating therewith, a glue applicator and a drying apparatus.

In such an apparatus, which is known for example from German Patent Specification No. 26 11 325, the corrugation of the paper web is effected by two heatable corrugating cylinders meshing with one another which are pressed under high pressure against one another. A glue applicator roll transfers glue to the corrugation crests of the corrugated paper web looping around the lower corrugating cylinder. An arriving cover coating web is pressed against the glued corrugation crests by the heatable presser cylinder. A holding device acting in the region of the lower corrugating cylinder ensures that the corrugated web is held on the cylinder surface of the lower corrugating cylinder. In this known apparatus it is disadvantageous that the deformation of the paper web by the two co-operating corrugating cylinders takes place over a very small zone of engagement, so that the embossing time of the paper is very short and a high application pressure is necessary. The consequences are heavy wear of the corrugating cylinders and also of the presser cylinder which passes the cover coating web, high generation of noise and a susceptibility of the entire roll system to vibration, whereby the quality of the corrugated pasteboard is disadvantageously influenced. Moreover mechanical guide devices are susceptible to wear and require frequent readjustment.

the invention is based upon the problem of improving the known apparatus to the effect that noise generation and roll wear are reduced, the quality of the corrugated cardboard is improved, and paper consumption and difficulties of adjustment of parts of the apparatus are reduced and the feed and introduction of the paper web are facilitated.

SUMMARY OF THE INVENTION

According to the invention there is provided an apparatus for the production of a corrugated pasteboard having a cover coating on at least one side. The apparatus comprises a toothed corrugating element, a toothed corrugating counter-element co-operating therewith, a glue applicator and a drying apparatus, wherein at least one corrugating element is an endless element which loops at least partially around the other element.

Due to the fact that at least one corrugating element is an endless element which partially loops around the other corrugating element and thus the region of engagement of the two elements is considerably enlarged, the embossing pressure can be reduced and the embossing time can be lengthened. Moreover the temperature acting upon the paper web to be corrugated can be reduced. Finally the moisture content necessary for the deformability of the paper web can be increased. Furthermore a considerable reduction of noise and lower wear of the corrugating elements are achieved. It is also possible to select a profile form with smaller radii of curvature at the profile tips, resulting in lower paper consumption per meter of corrugated pasteboard produced. A higher flat compression results for the corrugated pasteboard. Since guide plates or the like are eliminated, the frequenct readjustment and replacement of the guide plate is eliminated; maintenance of the apparatus is simplified. Finally the very heavily wearing weighting cylinder is eliminated due to the separately arranged drying apparatus with several heating plates lying side by side. The duration of action of the heat is considerably lengthened by such a drying apparatus. The working rate can be substantially increased.

BRIEF DESCRIPTION OF THE DRAWING

The invention will be described in greater detail below with reference to examples of embodiment which are illustrated in the drawings, wherein.

DESCRIPTION OF THE PREFERRED EMBODIMENT

Figure 1:
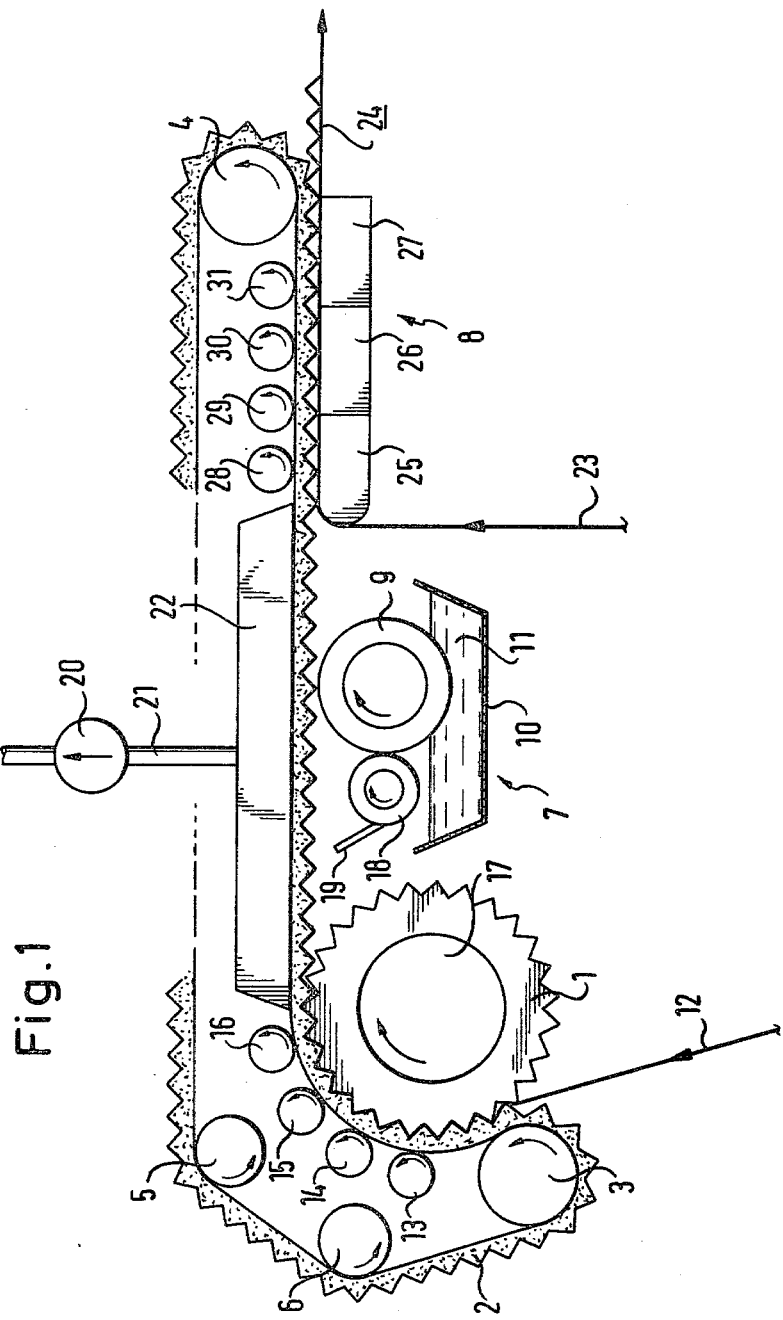
FIG. 1 shows a diagrammatic lateral elevation of a corrugated pasteboard machine for unilaterally coated corrugated pasteboard.

According to FIG. 1 the corrugated pasteboard machine for the production of corrugated pasteboard having a cover coating, for example on one side, consists essentially of a driven corrugating cylinder 1, and a longitudinally extending, driven, endless toothed counter-element or belt 2 which is guided by deflector rolls 3, 4, 5 and 6.

Beside or adjacent the corrugating cylinder 1 a glue applicator 7 and a drying apparatus 8 are present. The glue applicator 7 consists of a driven glue applicator cylinder 9 which dips into the glue 11 contained in a glue tank 10.

An entering flat paper web 12 is grasped by the corrugating cylinder 1 and the toothed belt 2 in engagement with it, and loops around or is engaged over at least a part of the circumference of the corrugating cylinder 1, for example over an angle of about 120°. The form or cross-section of the teeth of the corrugating cylinder 1 and of the toothed belt 2 is somewhat more pointed in profile than usual.

The toothed belt 2 is pressed against the corrugating cylinder 1 by the belt tension and additionally by several weighting rolls 13, 14, 15, 16. The spindles of the weighting rolls are mounted movably and loaded by appropriate presser springs arranged radially of the corrugating cylinder 1.

In order effectively to corrugate the paper web 12 the corrugating cylinder 1 is provided with a cavity 17 to which steam is fed to heat the corrugating cylinder.

The toothed belt 2 with corrugated paper web runs from the corrugating cylinder 1 on to the glue applicator cylinder 9 of the glue applicator 7. The glue applicator cylinder 9 transfers the glue 11 on to the corrugation crests of the corrugated web 12 which abuts on the toothed belt 2.

A scraper roll 18 with scraper 19 co-operates with the glue applicator cylinder 9.

The corrugated web 12 can be held fast in the corrugations of the toothed belt 2 by suction effect. For this purpose a suction chest 22, which is provided over the toothed belt 2 in the region of the corrugating cylinder and glue applicator 7 as far as the drying apparatus 8, is connected with a vacuum pump 20 by a suction conduit 21. A negative pressure is generated in the suction chest 22.

The toothed belt 2 can be longitudinally divided or can extend over the whole width of the paper web and in the latter case is provided with suction holes. The corrugated paper web is sucked against the toothed belt through the slots in the case of a divided toothed belt or through the suction holes.

The possibility also exists of the corrugated paper web being held fast in the corrugations of the toothed belt 2 by a mechanical retaining device, for example by guide rails (not shown).

A smooth covering web 23 is fed to the glued corrugated web at the beginning of the drying apparatus 8. Thus a corrugated pasteboard 24 with a cover coating on one side arrives in the drying apparatus 8. The drying apparatus 8 consists of a plurality of heating plates 25, 26 and 27 arranged side by side. The unilaterally cover-coated corrugated pasteboard 24 is pressed against the heating plates 25, 26, 27 by several weighting rolls 28, 29, 30, 31, for the sake of better heat transmission.

Figure 2:
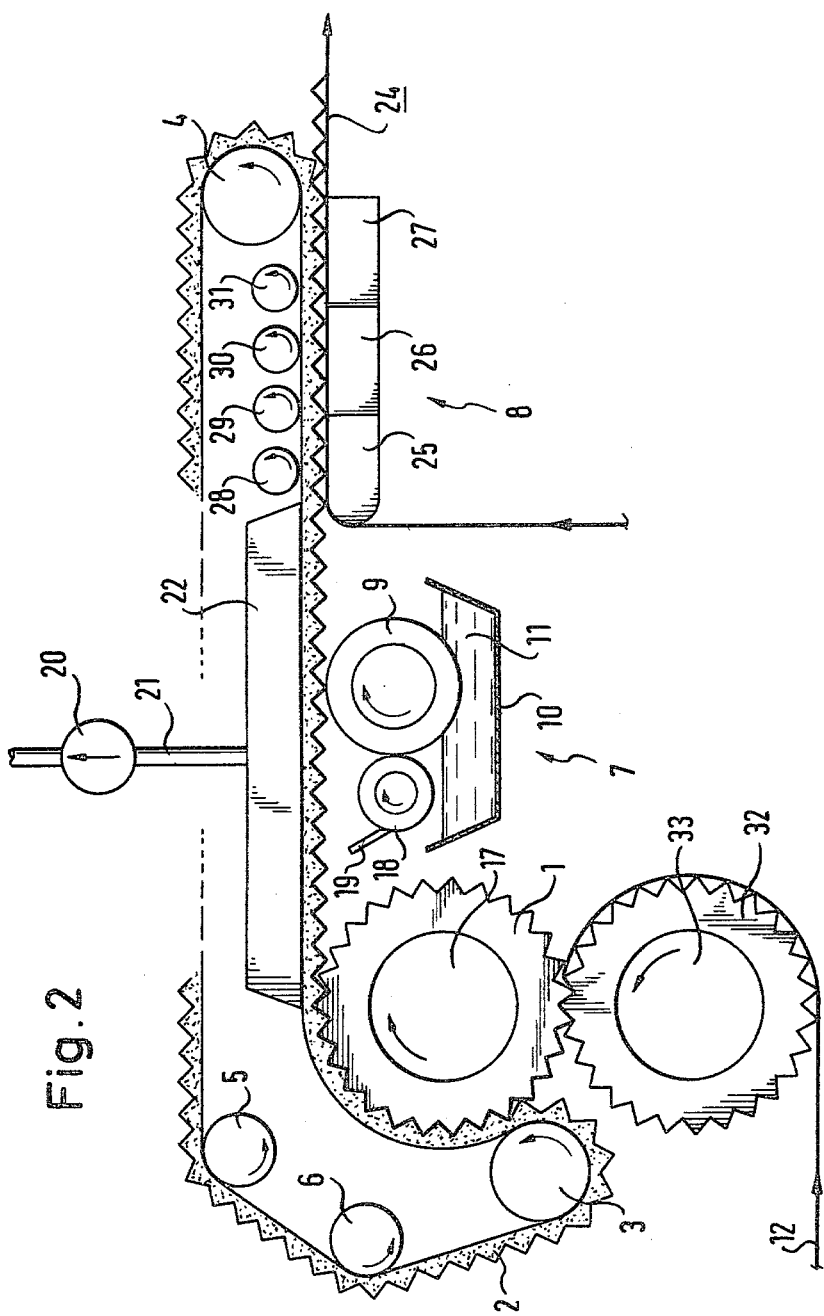
FIG. 2 shows a modified form of embodiment.

According to FIG. 2 the paper web 12 is corrugated as usual hitherto by two corrugating cylinders 1, 32 meshing with one another. The cavities 17 and 33 of the two corrugating cylinders are chargeable with steam for the heating of the corrugating cylinders. The endless toothed belt 2 transfers the corrugated web from the corrugating cylinder 1 to the drying apparatus 8. The belt 2 contributes to the fixing of the corrugation and thus permits a lower pressure application between the corrugating cylinders 1 and 32. The weighting rolls 13, 14, 15, 16 can be omitted since the toothed belt 2 here has substantially only a function of guidance.

In place of a toothed belt it is also possible to use a toothed chain which has the advantage that it can be subjected to higher temperatures and higher loadings.

It is also possible to corrugate the paper web by two toothed belts in engagement or by two toothed chains. The co-operation of a toothed belt with a toothed chain is also possible.

We claim:

1. Apparatus for the production of a single face coated corrugated pasteboard formed of a first web of material having two faces, and of a smooth covering web of material comprising:

a corrugated cylinder having teeth on its exterior for corrugating the first web of material;

a glue means adjacent the corrugator cylinder for applying glue to one face of the corrugated first web;

drying means adjacent the glue means and opposite the corrugator cylinder for drying the glue applied to the corrugated first web;

a corrugator counter-element cooperating with the corrugator cylinder to at least carry the corrugated web, the counter-element being an endless, longitudinally extending, toothed belt engaging over at least part of the circumference of said corrugator cylinder and said counter-element extending above said glue means and drying means to support the corrugated web of material thereover;

guide means arranged above said glue means and drying means for guiding said counter-element above said glue means and drying means; and means for engaging the smooth covering web of material against the one face of the corrugated first web prior to the corrugated first web entering the drying means.

2. The apparatus as claimed in claim 1 in which said belt has two opposed sides with one side engaging with the corrugator cylinder and further including first weighting means arranged against the other side of the belt in the region of the corrugator cylinder for loading the belt thereagainst.

3. The apparatus as claimed in claim 2 in which the weighting means are rolls.

4. The apparatus as claimed in claim 2 in which the weighting means are movable against the belt.

5. The apparatus as claimed in claim 1 in which the corrugator cylinder is a toothed belt.

6. The apparatus as claimed in claim 1 in which the drying means include a plurality of heating plates arranged side by side.

7. The apparatus as claimed in claim 1 in which the belt is formed of a plurality of parts with gap intervals.

8. The apparatus as claimed in claim 7 in which there are suction means arranged above the belt in the region of the glue applicator.

9. The apparatus as claimed in claim 8 in which the one side of said belt is adjacent said drying means and there are second weighting means arranged against the belt other side in the region of the drying means for loading the belt thereagainst.

* * * * *